(12) United States Patent
Miller et al.

(10) Patent No.: US 8,401,550 B1
(45) Date of Patent: Mar. 19, 2013

(54) METHOD AND APPARATUS FOR PROVIDING A PASS TO ACCESS MULTIMEDIA SERVICES IN A LIMITED GEOGRAPHICAL AREA

(75) Inventors: Robert Miller, Convent Station, NJ (US); Constance J. Coty, Whitehouse Station, NJ (US); John F. Murray, Denville, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 549 days.

(21) Appl. No.: 11/756,978

(22) Filed: Jun. 1, 2007

(51) Int. Cl.
*H04W 4/00* (2009.01)

(52) U.S. Cl. ............... 455/435.1; 455/435.2; 455/414.1; 455/456.1; 455/409; 455/436; 455/418; 455/422.1; 455/556.1; 370/310

(58) Field of Classification Search ............... 455/435.2
See application file for complete search history.

(56) References Cited

U.S. PATENT DOCUMENTS

| | | | | |
|---|---|---|---|---|
| 5,774,804 A * | 6/1998 | Williams | ....................... | 455/419 |
| 6,009,326 A * | 12/1999 | Roder et al. | ................... | 455/436 |
| 6,101,378 A * | 8/2000 | Barabash et al. | ............. | 455/406 |
| 6,185,414 B1 * | 2/2001 | Brunner et al. | ............... | 455/406 |
| 6,418,138 B1 * | 7/2002 | Cerf et al. | ...................... | 370/352 |
| 6,584,100 B1 * | 6/2003 | Ngo | .............................. | 370/377 |
| 6,612,488 B2 * | 9/2003 | Suzuki | .......................... | 235/380 |
| 7,190,969 B1 * | 3/2007 | Oh et al. | ........................ | 455/551 |
| 7,457,609 B2 * | 11/2008 | Cai | ................................. | 455/405 |
| 7,478,146 B2 * | 1/2009 | Tervo et al. | ................... | 709/220 |
| 7,542,763 B2 * | 6/2009 | Russell | ......................... | 455/423 |
| 2002/0151327 A1 * | 10/2002 | Levitt | ............................ | 455/556 |
| 2007/0014243 A1 * | 1/2007 | Meyer et al. | .................. | 370/249 |

OTHER PUBLICATIONS

Cingular Wireless University Sales & Solutions Employee Program, Copyright 2005 Cingular Wireless.*
Nokia 6010 User Guide, Copyright 2004 Nokia.*

\* cited by examiner

*Primary Examiner* — Willie J Daniel, Jr.

(57) ABSTRACT

Disclosed are systems, methods and computer-readable media for providing a pass to access multimedia services in a limited geographical area serviced by a fiber-fed, star-topology network (FFSTN). The method comprises receiving pre-registration information from a user to authorize one or more computing devices to obtain access to the fiber-fed, star-topology network covering a limited geographical area for a limited time, presenting the user with a plurality of customizable services each associated with capabilities of the respective one or more computing devices to access the FFSTN, and upon authorization, granting access to requested customized services for each of the one or more computing devices. Mechanisms are provided for handing off one or more devices as they travel from a first FFSTN to a second FFSTN.

18 Claims, 7 Drawing Sheets

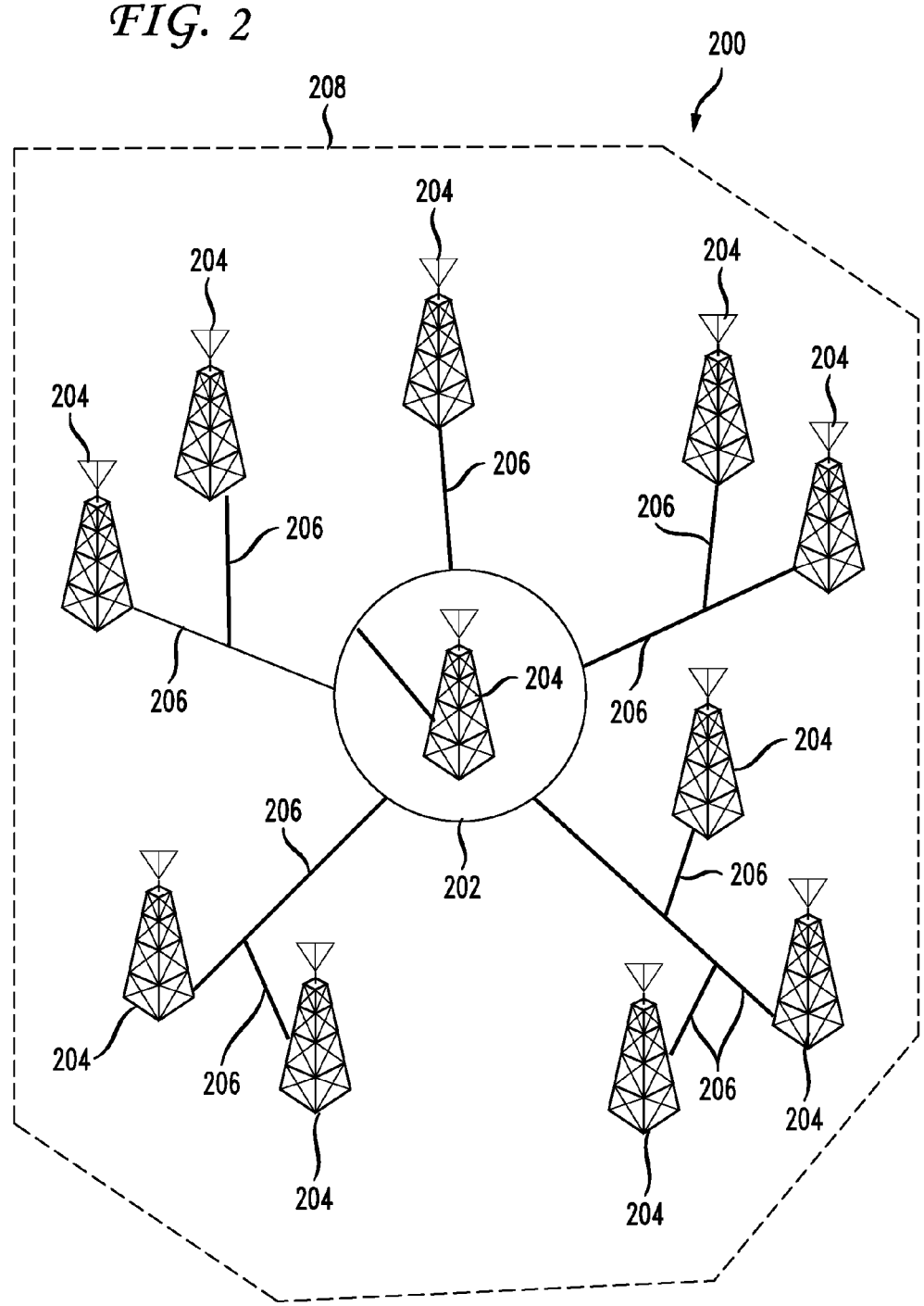

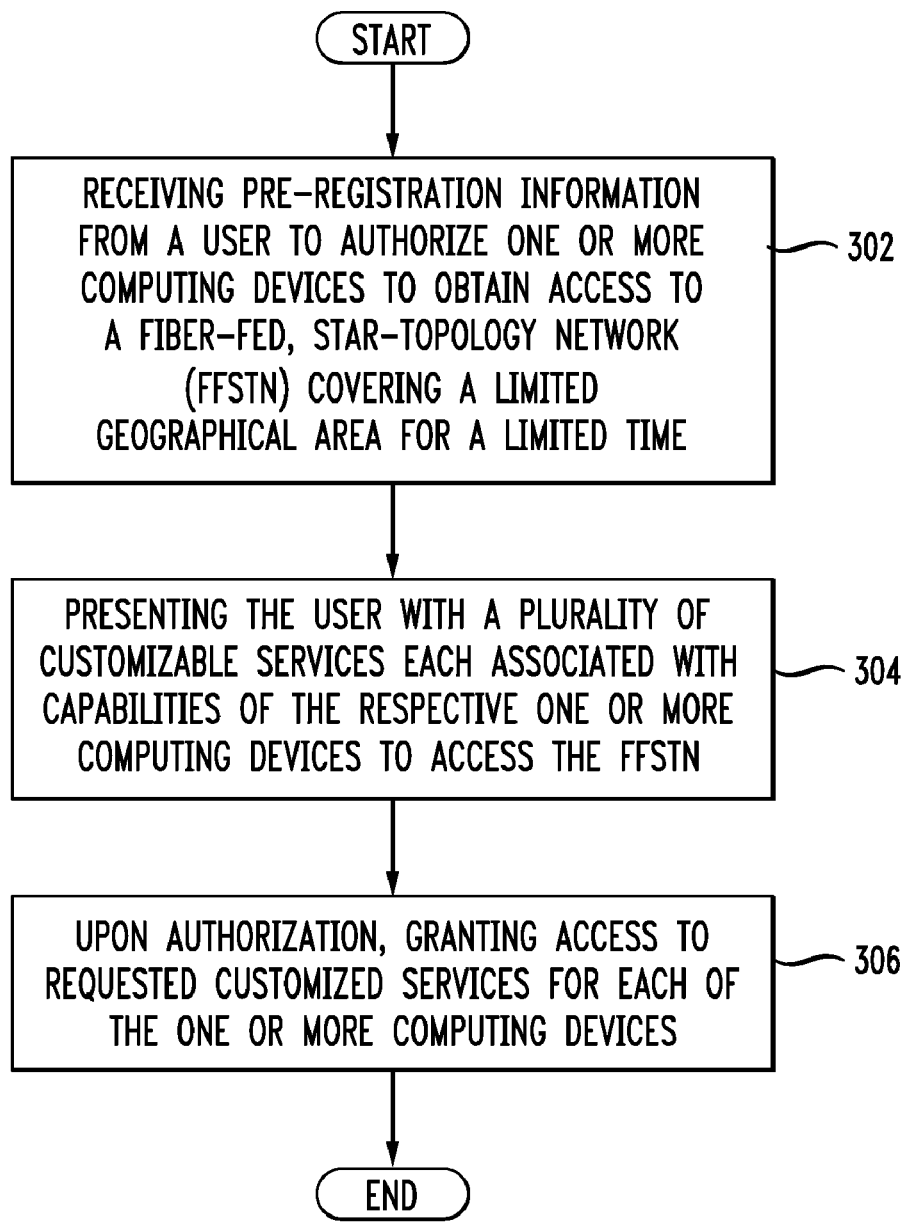

SUMMER PASS TO MULTI MEDIA SERVICES

CLICK ON DEVICES YOU WILL BRING

- [x] CELL-PHONE
- [ ] LAPTOP
- [ ] GAME BOY
- [ ] PDA
- [x] DVD/MEDIA PLAYER
- [ ] NINTENDO
- [ ] BLACKBERRY
- [ ] PALM DEVICE
- [ ] OTHER

CLICK ON DEVICES YOU WILL NEED

- [ ] CELL-PHONE
- [x] LAPTOP
- [x] GAME BOY
- [ ] PDA
- [ ] DVD/MEDIA PLAYER
- [ ] BLACKBERRY
- [ ] PALM DEVICE
- [ ] OTHER

CLICK ON SERVICE LEVEL DESIRED

| CHOSEN DEVICES | PLATINUM | GOLD | SILVER | BRONZE |
|---|---|---|---|---|
| [x] CELL-PHONE (GOLD) | ☐ | ☐ | ☐ | ☐ |
| [x] DVD/MEDIA PLAYER (GOLD) | ☐ | ☐ | ☐ | ☐ |
| [x] LAPTOP (BRONZE) | ☐ | ☐ | ☐ | ☐ |
| [x] GAME BOY (BRONZE) | ☐ | ☐ | ☐ | ☐ |

METHOD AND APPARATUS FOR PROVIDING A PASS TO ACCESS MULTIMEDIA SERVICES IN A LIMITED GEOGRAPHICAL AREA

BACKGROUND OF THE INVENTION

1. Field of the Invention

The present invention relates to wireless access to multimedia services and more specifically to a mechanism for requesting and receiving a pass for a plurality of services in a fiber-fed, star-topology network covering a limited geographic area.

2. Introduction

Local wireless access to the Internet has been growing in popularity. For example, restaurants, hotels and airports often provide "hot spots" where WiFi access is made available. WiFi is a wireless local area network (LAN) system that continues to grow and the radio modems enabling WiFi communication have been built into every laptop now sold. As a consequence, those who have used WiFi in their home and have used it in their business have now sought to connect elsewhere. As the desire to connect continues to increase, people expect to have access to high speed Internet service in a large number of places, particularly in downtown or suburban areas.

This expectation has prompted many cities, towns and municipalities (generally referred to as cities) to realize that they were on the cusp of an opportunity. Cities have begun to realize that they can build infrastructure and receive revenue from owning their own communications backbone which can include services such as WiFi. Cities receive some income by allowing communication utilities, such as cable and so forth, to lease space for their lines but the opportunity for cities to actually own the system and thereby receive further revenues has been largely denied. However, a new view of the abilities of WiFi, and the fact that the government has allowed free spectrum for WiFi, have caused cities to observe that they may provide citywide or at least downtown coverage for both visitors and constituents of the city. This capability becomes very important in the context of homeland security, because many of them are observing that if they combined their communication needs (police, fire, first respondents and so forth) and aggregated that with an offer to citizens and visitors, then basically the money saved on antiquated wireless communication for municipal use might actually partially pay for the network and provide an additional income stream. Cities have begun to declare that they are going to cover their main areas with WiFi coverage.

Wireless LANs are usually connected in some way that each Access Point (AP) is connected usually to an Ethernet connection. The challenge for a city is that, in comparison to a business or a home where it is easy to plug a wireless router into an Ethernet jack, Ethernet jacks are unavailable on the street. The only way to realize such connections is to run fiber or a metallic backhaul (a link across a mesh to a wired or fiber connection) to each lamppost that contains a base station in order to provide enough throughput. Essentially, this involves installing a cable modem or a fiber drop at every lamp pole, which is prohibitively expensive. Nevertheless, most cities, in order to support current and future needs to a broadband infrastructure for their citizens, have decided to put down fiber rings of their own in a citywide distribution. The structure of such a network may be similar to AT&T's use of fiber rings to volume deliver information to hubs that have star-like dendrites to distribute information to local access areas.

An issue then becomes near the fiber ring, how does one connect only these multiple APs or base stations? One solution of connecting multiple base stations to a fiber ring cities is implementing less expensive versions of a WiFi system that uses WiFi in two ways. The first way is the way it was always used, namely the connection from a base station to a laptop, as is normally done at a hotspot. However, some vendors have created a second instantiation of WiFi (called air interface) that uses a different MAC (media access control) approach. Media access control essentially means that a device asks: "am I allowed to talk or not, and if so, tell me when I can't." This is a way of promoting what is called multiple access among many users. Otherwise, devices would all try to speak at once, like in a crowded elevator and the result would be incoherent. They would all hurt each other's transmissions. Media access control does what its name implies, which is to mediate the ability to transmit information in a way that doesn't impact anyone else who is trying to transmit at least minimize the impact. Cities have created a second tier of WiFi that operates in a mesh topology. Mesh simply means is that the nodes that are representing the base stations of the municipal system are connected by fixed wireless links to other nodes on the second tier system. When a packet arises from a laptop, it travels from the laptop to a base station on the lamppost and then is transmitted collocated to another radio in the second tier. That radio talks via a fixed wireless link to another node. The packet is transmitted from node to node until it gets back to the municipality fiber ring.

Because the mesh of fixed links includes multiple connections, there is a natural resilience to the network because as packets are forwarded, the protocol will try to ameliorate any difficulties that may arise due to failure of a link, traffic congestion or other reasons. The difficulty with such an approach is that meshed systems, in order to save expense by using radio to relay the packets over many hops until it reaches a wired network connection called a gateway, lower the throughput of the geographic network as a whole. In addition, the mesh network delays the packets and, as such, these systems have difficulty in handling time sensitive packets such as may be produced by voice over IP, video or other realtime, rich multimedia traffic.

Accordingly, what is needed in the art are improved methods for enabling local government entities, such as cities and towns, to implement a variety of services via a wireless mechanism that includes sufficient throughput.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The invention includes a network, a system, a method, a computer-readable medium associated with providing a "pass" for a customizable set of services in a geographic area such as within a municipality.

A preferred method of providing a pass to access multimedia services in a limited geographical area serviced by a fiber-fed, star-topology network. The method comprises receiving pre-registration information from a user to authorize one or more computing devices to obtain access to a fiber-fed, star-topology network (FFSTN) covering a limited geographical area for a limited time, presenting the user with a plurality of customizable services each associated with capabilities of the respective one or more computing devices to access the FFSTN and, upon authorization, granting access to requested customized services for each of the one or more computing devices.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates a fiber-fed star-topology network;

FIG. 3 illustrates a method embodiment of the invention;

FIG. 4 illustrates a user interface for selecting devices and service levels;

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
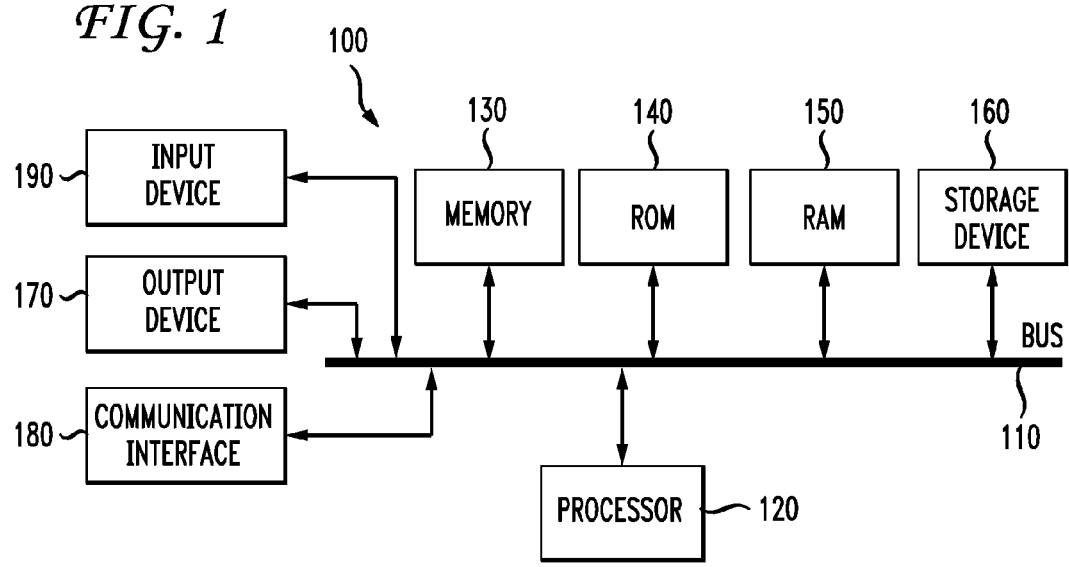
FIG. 1 illustrates basic hardware components in a system embodiment of the invention.

With reference to FIG. 1, an exemplary system for implementing the invention includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS), containing the basic routine that helps to transfer information between elements within the computing device 100, such as during start-up, is typically stored in ROM 140. The computing device 100 further includes storage means such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output means. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative embodiment of the present invention is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided. A "module" as referred here may relate to a combination of software and its associated hardware components combined to perform the recited functionality.

FIG. 2 illustrates generally a preferred network environment in which the present invention is applicable. The network 200 will preferably be associated with a geographic area 208 which may be a city, town, municipality, or any other local entity. As is noted elsewhere in this disclosure, an example may be a town or a resort in which can fund the build out of the network to enable visitors or people that live there to obtain access to a variety of services. A fiber ring 202 communicates with a plurality of base station 204 via fiber links 206. This may be referred to as a fiber-fed star-topology network, which comprises numerous small-cell radio ports or base stations which can sustain a large throughput and the necessary quality to provide a rich multi-media experience to users moving though out the municipality. The necessary computer servers or other computing equipment (not shown) will provide both the control of the functionality disclosed herein regarding pre-registration and access to one or more computing devices within the municipality 208.

An important service feature of such a network is the compelling content that resides in video games, music, movies, telephone service, means to purchase products, etc. An aspect of the invention is to enable cities to provide these advanced services for vacationers and citizens alike and that through the fiber-fed, star-topology network preserve the quality of service. The municipalities will preferably not provide these services using a radio mesh for the second tier backhaul but would rather use the direct fiber feed using what is called passive fiber.

Passive fiber is similar to what is called LightSpeed, invented by SBC. However, it is representative of a lot of broadband buildouts, and it is based on the principle that the only way the network can really deliver high throughput to a neighbor is to use fiber. Those of skill in the art will be familiar with the SBC LightSpeed project which deploys fiber to outlying nodes in the network that deliver voice, video and data services to households. The most expensive part of the delivery system is actually those few feet from the house to the curb. Most houses have copper wires currently, so the SBC LightSpeed offer runs fiber to the neighborhood. The network is called a fiber PON (passive optical network) which means it has no active optical or electronic repeaters in it. The PON uses only splices in multiple wave-lengths over the fiber to determine separation of individual content. LightSpeed is an evolutionary way that seeks to use fiber to the neighborhood, eventually fiber to the curb, and connects houses by DSL (digital subscriber line) or VDSL, which is a shortened acronym for very high speed digital subscriber line. One reason the throughput is fast is that, unlike the original DSL, the copper pair doesn't have to go all the way back to the central office, it can actually stop in the neighborhood. The length may only be a few thousand feet long as opposed to 10,000 or 15,000 feet. The LightSpeed network or similar networks will eventually expand to fiber all the way to the home.

Municipalities are thinking in a similar fashion because their municipal networks would be municipally owned duplicates of LightSpeed and, in the long term, may rent infrastructure facilities to private television companies.

In the preferred embodiment of the invention, a municipality would implement what AT&T has called a fourth generation (4G) wireless communication network. Such a network is based on the 802.11 standard, but is actually more capable of enabling multi-media communication, particularly QoS-bound multi-media. The network utilizes fiber-fed multiple base stations each having a small cell. The network is packet-based and Ethernet compatible. Such networks are fundamentally different from cellular technologies and are more aligned with 802.11 wireless LAN technologies to provide very high speed, carrier grade QoS and SLA capability, security and advanced resource management, such as interference avoidance, automatic spectrum adaptation and self organization. 4G connectivity is easily integrated into computers, PDAs, VIOP phones and dual-mode cellular/4G handsets. Those of skill in the art will understand the basic requirements for 4G carrier networking which includes the architecture, VLSI, reference designs, driver and networking software. An aspect of the 4G enhancement to 802.11 is a concept called "Mediaplex" because a point-coordinated architecture and companion MAC protocol which separates access and bearer functions in the time dimension and establishes admission control, schedules transmission and allocates time intervals in a superframe for non-contention communication of packets. Mediaplex provides protocol enhancements that allow base stations to act as "super users" of a resource and to synchronize base station transmission and support negotiation for shared radio resources. This protocol enables meshed operation with other nearby base stations one reuse distance away.

What the preferred 4G network enables is that WiFi changes from just being a wireless substitute for an Ethernet cord to a genuine public interface, like cellular, which means that its specifications enable the use of the same device everywhere in the municipality and receiving the rough equivalent of service everywhere. In other words, each user has an expectation of QoS and they get it wherever they connect. It's compatible with existing and future hardware so that users are not frozen out by saying, "You can't operate here because you get CDMA and we only do TDMA."

Municipalities which would implement a 4G fiber-fed star-topology network utilizing small cells as disclosed in FIG. 2 could operate such a network in at least three ways. One, the cities could operate it in a standard "list spot" manner as an internet access means. Two, the cities could operate it as a municipal services network and save money on antiquated radio systems. Three, the cities could grant vacationers a package deal that is effectively an all-you-could-eat offer so that if you stay in that city and vacation, regardless of where you stay, whether you rent a house or a condo or an apartment or camp, the user gets a "summer pass" which entitles him/her to essentially all of the content that can be accessed over the network. The content may be Internet service, phone calls, e-mail, other personal communication such as SMS messages or instant messages, movies, gaming, music, etc. The user logs onto this system once after securing or pre-registering for the summer pass (for presumably a fee). The user chooses the services they want and would be able to configure those services to best meet their needs. The user does this through a "dashboard," which would become available when logged onto the network. Basically, the user logs onto the network and it presents a special page, wherein the user inputs the summer pass authentication number. The system effectively presents an array of services that the user can customize as desired.

For example, the user could selectively forward their phone calls from their home to the summer address, but only if it met the criteria like if it's from a particular family member, an emergency call from the police, etc.

In another example, the user could configure movies for the kids to receive, so that they could only pull down G-rated movies, or if the user particularly likes science fiction only, then it would offer them only sci-fi movies so the user wouldn't be burdened with having to go through all the other genres. For games, again, the system provides child protection capabilities or it may only offer the particular kind of parent-approved games. Further, the user can identify in the dashboard that the gaming device is a Nintendo or a Play Station 3 portable, etc. Accordingly, the dashboard enables purchasers of the summer pass to configure and control the access to the numerous possible multi-media services available within the municipality network environment.

Another example of the functionality of the present invention is provided. Assume a user has a laptop and is bringing his family on a vacation to a resort. Both the husband and the wife have cell phones, but the two children attending the trip have no computing devices. The dashboard enables an adult in the family to use their laptop, access the dashboard and either configure their current computing devices (two cell phones and laptop) to a summer pass program and/or include additional devices to lease. In this regard, the dashboard interface enables a user to configure the properties of a particular device to ensure that the system can allow the users to join the network and enables a pre-authentication process that allows everyone to reach a particular page where they can authenticate on the network and tell the system what devices they have. FIG. 4 illustrates one example screen in a dashboard interface. Window 400 includes a page that enables a user to click on the devices that they will bring, such as a cell phone, laptop, Gameboy, PDA and so forth. There are also options to click on devices to lease while at the resort or in the municipality. These also include a listing of the available devices that users can borrow. From this initial page, users will further be able to, either through their own devices or leased devices, identify each individual device and configure those devices in advance, such that upon entering the resort or other municipality the users will be able to be directed to opportunities for their multi-media content.

As an example of how this may be done, the family discussed above may be able to enter that they are going to bring two cell phones and a laptop and desire to lease two DVD/video players which also may include the ability to communicate with the network wirelessly. Therefore, as each of these is selected further pre-registration and selection of multi-media services and content are presented to the user. Therefore, the user may identify a cell phone number and services such as forwarding phone calls that are directed to home to that cell number during the duration of the vacation at the resort. The laptop may be identified in some manner such that Internet access is automatically granted as well as perhaps options to see certain movies that are pre-selected or be presented with certain types of movies or other multi-media presentations on the laptop. Similarly, the children have been given portable media players, such as DVD players or small devices that have means to wirelessly communicate with the network, these may be configured for Disney movies or only G rated movies such that when the family arrives at a hotel room within the resort or municipality, the children will not have to carry or bring a stack of DVD movies, but will be able to browse pre-configured menus on their portable media devices and select particular movies that are known to be appropriate in advance. Enabling simply pre-configuration of each device in advance can render the experience of the family at the resort much more enjoyable and seamless.

Figure 6:
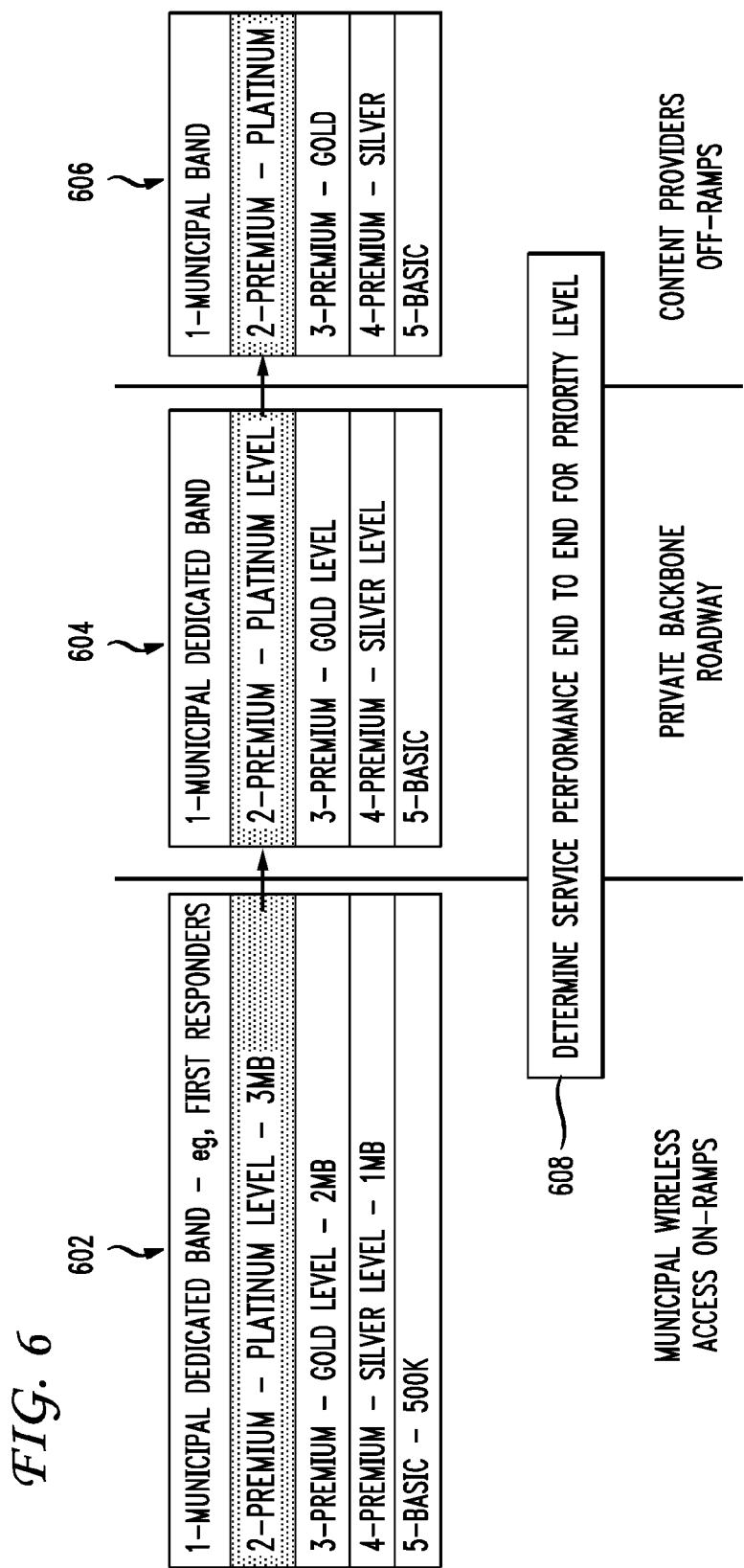
FIG. 6 illustrates priority usage and performance via transitioning gates and service levels.

Furthermore, as shown in FIG. 4 the user also, once the chosen devices are identified, may be able to click on the desired service level which will provide the various levels of content and quality of service. As is shown, for each chosen device the user can desire the platinum, gold, silver, or bronze levels of service that are provided by way of example. FIG. 6 below illustrates some example of these various service levels that may be selected. As will be known with skill in the art, there are many variations on the types of service levels and ways to characterize such service levels.

Behind the dashboard shown in FIG. 4 are a number of service level agreements (SLAs) which are in place with various content providers and/or network providers. Having the various SLAs in place enables the system to present options for a summer pass which the system can deliver and as a user chooses the various devices and possibly Internet speeds behind all of the decisions, each of those decisions is supported from one or more content and service providers having SLAs with the municipality. The mapping of all of these various services to individual user devices in the context of a summer pass is performed by a session coordinator 509 discussed more fully below with reference to FIG. 5.

FIG. 3 illustrates the basic steps of a method embodiment of the invention. The method is preferably practiced to provide a pass to access multimedia services in a limited geographical area serviced by a fiber-fed, star-topology network. The method comprises receiving pre-registration information from a user to authorize one or more computing devices to obtain access to a fiber-fed, star-topology network (FFSTN) covering a limited geographical area for a limited time (302), presenting the user with a plurality of customizable services each associated with capabilities of the respective one or more computing devices to access the FFSTN (304) and, upon authorization, granting access to requested customized services for each of the one or more computing devices (306). The presented plurality of customizable services may include one or more of the following: call forwarding to one or more of the computing devices to be authorized or the FFSTN, control of available movies, video or music, control of available games, access to the Internet, and access to means for personal communicating such as emails, short messaging, instant messaging or other services. The services may also include a controlled forwarding and dialog interaction with senders of voice mail messages, emails or other types of messages wherein the system may obtain a level of urgency of any particular communication prior to forwarding that communication to the user in the summer pass environment.

The FFSTN may be owned by a local government entity such as a city, town or municipality. At least one of the one or more computing devices receiving access to the FFSTN may be leased for the duration of the pass.

Another aspect of the invention involves providing as part of the pass for each computing device plurality of customizable services includes control of purchasing power based on each computing device authorized on the FFSTN for the duration of authorization. For example, the system may enable parents to connect $100 to each of their children's computing device for the duration of the summer. Within the municipality, the child can then purchase items via the summer pass as well. Then at a point of sale, the retail attendant may either enter data into the portable computing device or receive information from the device manually or via a wireless communication of data to purchase an item and deduct from the pre-established amount for that device. This process can increase the ease with which users of the summer pass can purchase items within the municipality and also aid visitors in controlling the use of money on their vacation.

Figure 5:
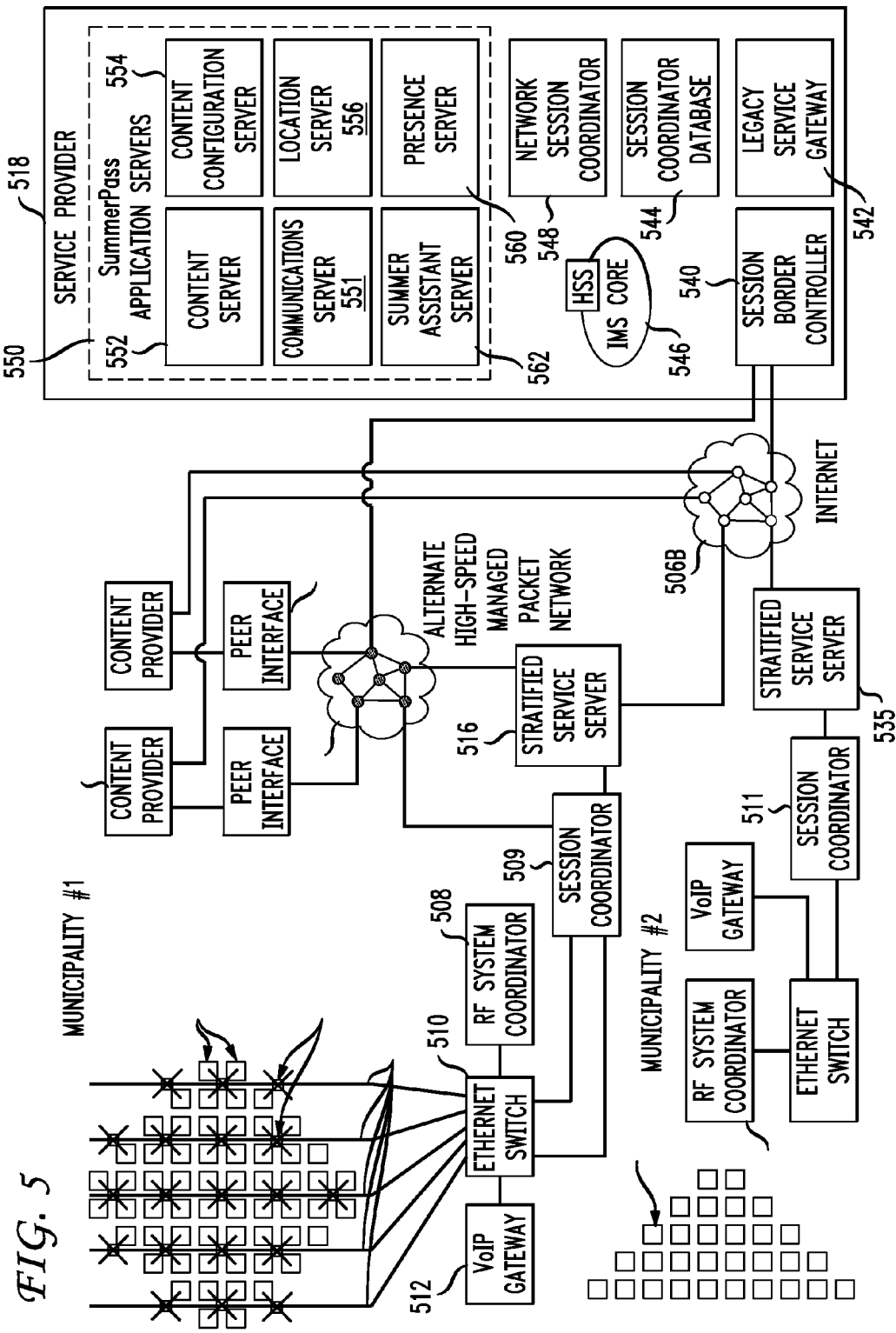
FIG. 5 illustrates an example network according to an aspect of the invention.

FIG. 5 illustrates how the summer pass may enable access to the service delivered by a municipality and how inter-municipality services may exist. A multi-municipal network 500 is illustrated by way of example. To deliver service in a municipality, a wireless network is deployed within municipality #1. The municipality's infrastructure might consist of the VoIP gateway 512, an Ethernet switch 510, and an RF system coordinator 508. The VoIP gateway 512 allows delivery of local phone calls into the local exchange. The Ethernet switch 510 supports multiple connections 538 of simultaneous users and handles the gigabits of data being transferred between users and the system coordinator 508. Base stations 540 provide coverage to multiple smaller cells 514 in the municipality. Links 538 connect the base stations 540 to the Ethernet switch 510. The RF system coordinator 508 communicates with the RF elements within the system and manages access frequency usage of the system. The next step up from the Ethernet switch is the session coordinator 509. While the RF system is coordinating and lining a user up to a communication channel, the session coordinator 509 maps that channel out to the different services available and handles security associated with that service. The session coordinator 509 matches the various flows of information to the one or more computing devices within the user's summer pass to provide the various services. The session coordinator 509 manages the flow of information from preferably the local network and isolates to some extent the communications from the broader network while providing security. A Stratified service server 516 determines whether traffic should be aligned towards the internet or toward a local provider based on better performance, reduced cost, failure recovery, improved user experience and so forth. For example, if a user is accessing the internet for some service but the Stratified service server 516 learns through a series of discovery mechanisms that the same service is available through an alternate improved path, the Stratified service server 516 can reroute that flow or coordination of service to that preferred path to improve the experience, reduce cost, or recover from possible failures that may occur.

The stratified service server 516 and the session coordinator 509 are both connected to an alternate high-speed managed packet network 506A, which can give preferred services to users at an additional cost. This generally represents any kind of network that a municipality or a service provider may have a business agreement where to provide services and data. The Alternate-High Speech Managed Packet Network 506A may represent a private data center such as an AT&T or Verizon data center. For example, a municipality may contract and may engage in a service level agreement with a company such as AT&T or Verizon to provide services as a primary service provider rather than provide services in a roaming context. The alternative is to route the users through the internet 506B. From either the packet network 506A or the Internet 506B, the user is routed to a service provider 518. A typical service provider 518 might contain a session border controller 540 that demarks that services entering the core group of services using the standard IP Multimedia Subsystem (IMS) Core 546. The IMS Core is an architectural framework that delivers IP Multimedia services to end users. The HSS, shown in FIG. 5, is the home subscriber server or the user profile server function. This is the master user database that supports the IMS network utility that is actually handling the call sessions or communication. The HSS contains subscription-rated information such as user profiles and can perform authentication and authorization of the user and can further provide information of the physical location of the user in a means known to those with skill in the art.

The summer pass application servers 550 are on top of that core 546 and keep track of user-related information such as content 552, content configurations 554, communication servers 551, location 556, and presence 560. The summer assistant server 562 would essentially act as the user's agent. For example, if the user was on summer vacation, the summer assistant server 562 configures the services the way the user wants in the environment. The service provider 518 also includes a network session coordinator 548 and the session coordinator database 544. These enable the core capability which allows the system to remap people's experience to anything that's needed at that point in time.

The session coordinator 509 and the stratified service server 516 utilize the network session server 548 and database 544 to coordinate a person's needs, uses, and network demands to match up a user with their services that they need in a private and secure manner. The service provider 518 might also contain a legacy service gateway 542 in order to maintain access for users who still use legacy services. The service provider 518 enables the user to have configurable services in the summer pass agreement. For example, the service provider 518 may forward calls to their home telephone number, but only from certain people and only in emergencies. The system may engage in a dialog with the caller such that the caller may be able to indicate via pressing a touch tone number or via spoken natural language dialog that the call was an emergency in which case the system will forward the number to your summer pass environment. Furthermore, other communications such as short messages, emails and so forth may automatically engage the sender in a dialog to determine whether to forward the email to the user.

For example, it is known in Microsoft Outlook to use a "out-of-office assistant" in which the user if he or she is out of the office may automatically generate a single responsive email to the sender. Typically, this responsive email notifies the sender that the user is out of the office and provides information on how to call an assistant or leave a message or when the user will contact the sender. Therefore, rather than simply sending a responsive email, the system engages in a simple dialog in which the responsive email may include several options to grade the level of importance of the email such that if it is an emergency email from the sender, such importance can be identified via a click mechanism and upon which the email can then be forwarded to the user in their summer pass environment. The type of dialog that engages the sender of a message may depend upon the type of the method used to send the communication, the ability of device i.e., whether one is sitting at a laptop computer or sending a short message via a handheld device and so forth.

One advantage of the service provider 518 is that it is also scalable in the sense that the service may be shared by many municipalities which can also share the expense of the system. When content is to be delivered to the user via the alternate high speed managed packet network, at least one via interface 504A, 504B may be used to enable communication of data between the packet network and content provider 502A, 502B.

Another aspect of FIG. 5 relates to the user roaming between multiple municipalities. If the user wants to move between multiple municipalities, the system 500 can expand their summer pass without suffering an interruption in service. The second municipality has a local infrastructure 536 separate from the first municipality. For example, the second municipality has its own RF system coordinator 532, Ethernet switch 534, VoIP gateway 530, session coordinator 511, and stratified service center 535. When the user roams from the first municipality to the second, the session coordinator 511 will get the user's information using either the same service provider 518 or a different service provider that shares a peering or commercial arrangement with the first service provider. Thus, the user can move from one municipality to the next without losing or having to reconfigure which services they desire. This is a handing off approach from one municipality to another.

We next discuss an example of a user who has ordered several services in a summer pass such as Internet access on a computer or other device and cell phone access and then the scenario of when that user moves from municipality #1 to municipality #2. As the user registers for a summer pass and receives a log-in and a password, they gain access to the system. Using the web-based services discussed herein, they configure various devices and the services for the summer pass. As an example of municipality #1 may be where a user sets up their summer pass and this municipality may support a "wall garden" access to just the summer pass environment to enable the user to surf the Internet from their hotel room or in the municipality or it may be part of being able to receive information on their TV in the hotel room and use that as a browser to get access to the server to sign up for services and so forth. The access coordinator sets up a pass that allows you to access the system and nothing outside of your summer pass. Once the summer pass is set up, the system uses flow-through provisioning which actuates the various services associated with the summer pass. One aspect of the invention may be a "summer assistant" which is part of the service provider 518 features that for a minimal fee for a year it can maintain your account and once you have configure certain key phone numbers and other aspects of your summer pass you won't have to reenter the same information each time. Therefore, as the user may go through a dashboard and provide call forwarding and details (such as when my sister calls here is what I want to have done with that phone call) and so forth. Such information can be maintained once it has been configured so it does not have to be reentered every time a summer pass is desired.

One possible mechanism to simplify the approach for specifying forwarding services is through an agreement with the user's telephone company (and with proper authorization) to pull up the user's phone bill for last month or the last several months and enable the user to go down the list and click on which numbers that they recognize and that they would want to be forwarded into their summer pass environment. This may provide a more simple way for the user to be able to configure their summer pass without entering multiple digits of each phone number.

In another example, the summer pass may be a winter pass where skiers who go to Aspen every other weekend may also set up a similar arrangement such that every time you enter the municipal environment you already are remotely programmed and the appropriate flow through provisioning is done and the services according to your pass are remotely programmed. Therefore, there may be a TGIF pass or weekend pass or any other kind of pass may be configured according to the principles disclosed herein.

Some users may have dual cell phones such that they may have both CDMA or TDMA services as well as a protocol which enables them to communicate through high speech fiber optics with a cell phone. Clearly, such devices may be configurable through the dashboard and they may be able to communicate with the network that they want to use an ultimate mode of operation to screen calls, push voicemail access for certain callers and provide your path through a list of numbers of people would be enabled to reach me. In other cases where users may have devices such as Blackberry's or Palm Trio devices then they would be able to select certain functionality such as web clipping and a speed feature where they may want to be able to obtain access to the Internet with reduced content because of the size of their screen. In such a case as the user engaged in the dashboard to configure their devices the session coordinator 509 would map the user to the right services. In a wireless case, it may use the wireless access portal (WAP) to map to the desired service with the device. The session coordinator 509 would open up a connection out of the application server or the service provider who is providing that kind of service to the device and sure that the data is communicated securely and reliably to your device.

Continuing on with the scenario of a person moving from one municipality to another municipality, when the user leaves municipality #1 and arrives in municipality #2 the prime issue is that the session coordinator 511 will receive the necessary information back from a shared database. Municipality #1 and Municipality #2 may be inter-managed by the same overall service provider 518 providing initial coordination or these two separate municipalities may be controlled or managed by separate service providers and have a peering arrangement or some kind of commercial arrangement which enables the handoff. In either case, with the user entering the new municipality one or both of the session coordinators 509, 511 will communicate such that the user may be presented with a portal or it may be done automatically such that the system would update itself and connect the user back to existing services. The flow-through provisioning may be operable to make available the content and services in municipality #2. There may be a manual step of acknowledging that you have entered a second municipality now that you are in a new place, but once the user gets past the initiation of services, then the user experience in municipality #1 should be duplicative of municipality #2 (of course the second municipality may have different capabilities from the first municipality which would be automatically managed in the provisioning and appropriate notifications to the user of modified services as well as a modified cost may be provided).

One way that this may be done is through a brief dialog with a cell phone. For example, as a user enters the new municipality, the system may send a dialog through a short messaging service that asks "have you entered municipality #2 John?." This is one mechanism which may be done but a variety of ways may be used for roaming. For example, the user may have already told his summer pass assistant that he is moving to a new area and to authorize roaming charges. Therefore, when the user goes to a new municipality and the system detects the user in that municipality, the roaming municipality may send a message back to the session coordinator 509 which can communicate a message to let the user operate from multiple municipalities. Or, the user may set via the dashboard that a daughter's phone may first ask for some identification or acceptance before enabling access in municipality #2. Part of this process may involve actually forwarding the request to a phone or short messaging service saying that your daughter has requested services in municipality #2 which provides the parent with notification of where she is (or at least where her cell phone is). While there may be many mechanisms for providing such a handoff from municipality #1 to municipality #2, a basic feature is that the session coordinator 509 and/or 511 will remap and provision existing services into the new municipality.

An aspect of this is that while this communication uniquely provides a notification of where the user is by registration, whether it is cellular or log in or WiFi system and so forth. As the user shows up in a new area, the network knows where he/she is and can identify the location. This is done by known method such as circuit-switch technology and circuit-switch signaling to what is called HLR/VLR which is location registry and gives a profile of what services you are entitled to with your summer pass or if you are roaming some where else, what profiles can be shared with a distant roaming place so that your services are the same. In the context of a cellular communication, the HLR/VLR uses proprietary signaling and is not necessarily convenient for newer versions of IP systems. Accordingly, the present system is preferably designed to allow a function similar to cellular roaming but is more appropriate to an IP environment. Accordingly, in the 4G context, to provide a similar functionality to HLR/VLR that is transparent for the user it is preferable to move this functionality up in the communications stack of where mobility is from the access layer up to the session layer in terms of the IP communications stack. Previous technologies knitted together very low level physical communication path such as phone numbers. In the present context, the functionality is in a more abstract layer above IP addresses which leverages the environment but still need to coordinate those services being used in a session and being able to move that session from place to place. Accordingly, rather than just a typical WiFi hot spot which does not do anything special other than provide Internet access, an aspect of the present invention is in addition to authenticating users on a system or a roaming environment, it also enables the configuring of the summer pass bundled group of services for the users as they move about into new environments.

A further aspect of the invention is illustrated in FIG. 6. This figure illustrates the priority usage and performance via transitioning gates and service levels. The purpose for these service levels is that applications need to enhance transport completion in the sense of providing an appropriate quality of service and the multi-protocol label switching (MPLS) as needed at various levels for users as well as emergency responders. For example, as a person physically drives in a municipality having a fiber network with availability of a summer pass as is taught in the present application, there are bottlenecks that may be identified at each "gate" or which may physically be freeway on-ramps or off-ramps or other roadways entering into, leaving or as part of the physical structure of the municipality. For example, the capacity of off-ramps may be lower than a capacity in the middle of a business or entertainment district. This can result in increased peering that is required at the service provider level. FIG. 6 is divided into three columns. The left column 602 illustrates the municipal wireless access for on-ramps. The various services which may be provided may be, as shown in row 1, a municipal dedicated band which is dedicated to first responders. Local users or visitors may be provided with a premium or platinum level of service which may be, for example, 3 megabytes. Other levels such as a premium gold level may be provided at, for example, 2 megabytes, a silver level at 1 megabyte and a basic level at 500 Kbs. Of course these levels are subject to change and only provide a general illustration of the various service levels which may be offered. The center column 604 illustrates a private backbone, such as AT&T's backbone, on a roadway with a municipality. Here there also may be similar corresponding levels such as shown in row 1 where a municipal dedicated band is shown. Premium levels 2-4 may provide a platinum level, gold level and silver level of quality of service and an MPLS service and number 5 illustrates a basic level. Similarly, column 606 shows a similar arrangement of service levels for content providers in a location of off-ramps. Part of a summer pass package may include determining or providing service level performance from end-to-end for a certain priority level 608. As is shown in row 2, the service performance may be provided at a level such as a platinum level through transitions into and out of the particular municipality.

Another aspect of FIG. 6 relates to the various tiers of services. For example, the platinum level in Row 2 may also include other features such as video, voice, games and data. The gold level may include video, voice and data without providing a game feature. Similarly, a silver level may only include voice and data and so forth. Accordingly, an aspect of the features provided herein is the demarcation of a particular service package which may be offered to vacationers, business travelers, full-time users that live there, as well as in-network and out-of-network users.

Figure 7:
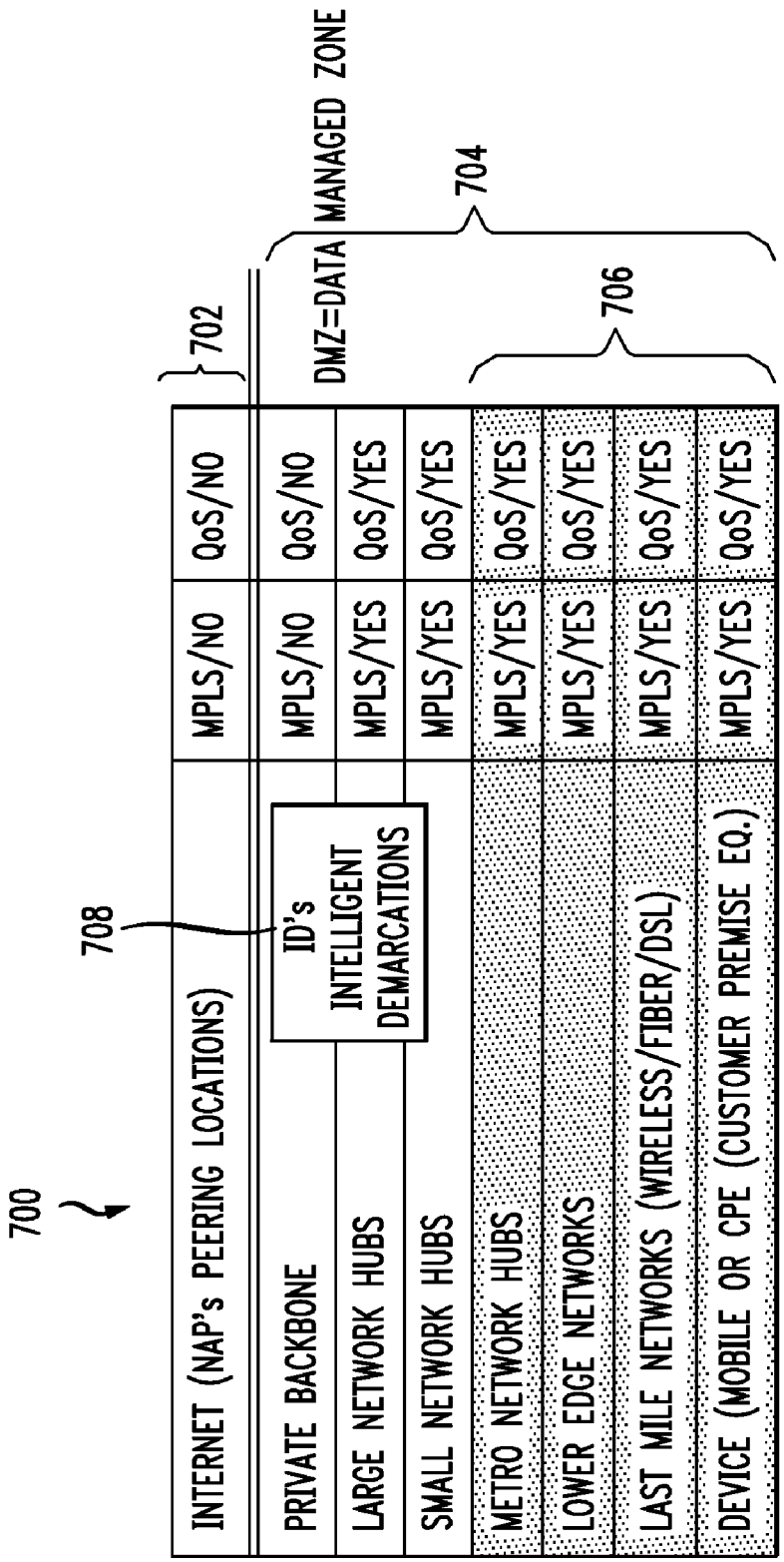
FIG. 7 illustrates network demarcations and MPLS/QOIS identifiers.

FIG. 7 illustrates a network demarcations and Multi-Protocol Label Switching MPLS/QoS identifiers in support of end-to-end to get guaranteed network service level performance 700. Row 1 702 illustrates a general internet or NAP peering locations. This illustrates where a user would have no service level agreement and you would need a content service level contract to be able to receive such service. Rows 704 illustrate where a service level agreement, such as a summer pass, is available within a private network such as an AT&T network. This would fall under a data managed zone and may include such hardware features as a private backbone, such as AT&T's backbone, large, small and metro network hubs. Lower edge networks as well as last mile networks which provide wireless, fiber or DSL access to the last mile. Finally, the local device which is on a customer premises which is a mobile or a fixed customer premise equipment CPE. Row 708 illustrates intelligent demarcations support specifics defined in a MPLS/QoS network capability. These are established to reduce latency and content delivery. It is preferred that within each municipality a contracted metro network and end mile will be negotiated in terms of MPLS/QoS for required bandwidth availability. Either users or participants within the municipality and content providers will engage in content service level agreements that will be established to support content bandwidth availability which will support an end-to-end service performance guaranteed for the end user. Row 706 illustrates the municipal environment and the particular components which if an entity such as AT&T approaches to provide a summer pass capability as disclosed herein, such hardware, shown in Row 706 may represent the particular multi-network footprint provider hardware which may be possible or necessary for enabling the concepts disclosed herein.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the context of the invention may be a home, a hotel, a convention center, a resort and so forth. Any geographic area may utilize the principles of the "Summer Pass" to multi-media services. Other systems include enabling visitors to a resort or community to purchase a "bulk" multi-media/wireless access privilege for the duration of the stay. In other words, another aspect of the summer pass may be to grant several stratified grades of access and/or content privileges which afford the user the ability to use wireless devices and to provide unlimited or stratified limited access to the Internet, email, VOIP, music, gaming, video, tickets for concerts, etc. for a flat time-based fee. Thus, the user can use the wireless broadband device anywhere in the community during the stay while enjoying the unlimited access to these services and multi-media content. The access system according to an aspect of the invention may be coupled with a service management segment that authorizes users and dispenses multi-media to them on a prepaid basis corresponding to the time interval although other criteria may also be applied such as a total throughput or a specific content limit. The management system provides the ability to authorize users not only to access the system but to draw upon the particular media entitled by their summer pass. Accordingly, the appended claims and their legal equivalents should only define the invention, rather than any specific examples given.

We claim:

1. A method comprising:
   receiving from a user, via a processor, pre-registration information for use in authorizing a plurality of computing devices to obtain access, for a limited time, to a fiber-fed, star-topology network covering a limited geographic area,
      wherein at least one of the plurality of computing devices is not a cellular telephone,
      wherein the plurality of computing devices comprise known computing devices currently available to the user and unknown computing devices to be made available to the user within the limited geographic area, and
      wherein the limited geographic area comprises a private resort;
   presenting to the user an interface for selecting and configuring a plurality of customizable services each associated with capabilities of at least a respective one of the plurality of computing devices to yield requested customized services for each of the plurality of computing devices; and
   upon authorization, providing non-subscription-based and non-recurring access to the requested customized services for each of the plurality of computing devices located within the limited geographic area.

2. The method of claim 1, wherein the plurality of computing devices comprise at least one of a laptop, a cell phone, a personal digital assistant, a portable gaming device, and a portable music device.

3. The method of claim 1, wherein at least one of the plurality of computing devices is leased for the duration of the access.

4. The method of claim 1, wherein the plurality of customizable services comprises: call forwarding to the plurality of the computing devices to be authorized on the fiber-fed star-topology network, control of available movies, video, music, control of available games, access to the Internet, and access to means for personal communicating.

5. The method of claim 1, wherein the plurality of customizable services comprises control of purchasing power based on each computing device authorized on the fiber-fed star-topology network for the duration of the access.

6. The method of claim 1, further comprising:
   handing off a user from a first fiber-fed, star-topology network to a second fiber-fed, star-topology network via communicating the pre-registration information from a session coordinator in the fiber-fed star-topology network to a session coordinator in the second fiber-fed star-topology network.

7. A system comprising:
   a processor; and
   a computer-readable storage medium storing instructions which, when executed by the processor, cause the processor to perform a method comprising:
      receiving from a user pre-registration information from a user to authorize a plurality of computing devices to obtain access to a fiber-fed, star-topology network covering a limited geographical area for a limited time,
         wherein at least one of the plurality of computing devices is not a cellular telephone,
         wherein the plurality of computing devices comprise computing devices currently available to the user and computing devices to be made available to the user within the limited geographic area, and
         wherein the limited geographic area comprises a private resort;
      presenting to the user an interface for selecting and configuring a plurality of customizable services each associated with capabilities of a respective one of the plurality of computing devices to yield requested customized services for each of the plurality of computing devices; and
      upon authorization, providing non-subscription based and non-recurring access to requested customized services for each of the plurality of computing devices located within the limited geographic area.

8. The system of claim 7, wherein the plurality of computing devices comprise at least one of a laptop, a cell phone, a personal digital assistant, a portable gaming device and a portable music device.

9. The system of claim 7, wherein at least one of the plurality of computing devices is leased for the duration of the access.

10. The system of claim 7, wherein the plurality of customizable services comprises: call forwarding to at least one of the computing devices to be authorized on the fiber-fed star-topology network, control of available movies, video, music, control of available games, access to the Internet, and access to means for personal communicating.

11. The system of claim 7, wherein the plurality of customizable services comprises control of purchasing power based on each computing device authorized on the fiber-fed star-topology network for the duration of the access.

12. The system of claim 7, the computer-readable storage medium storing additional instructions which, when executed, cause the processor to perform a method comprising:
   managing a hand-off from a first fiber-fed star-topology network to a second fiber-fed star-topology network via communicating the pre-registration information passed from a session coordinator in the first fiber-fed star-topology network to a session coordinator in the second fiber-fed star-topology network.

13. A non-transitory computer-readable medium storing a computer program storing instructions which, when executed by a processor, cause the processor to perform a method comprising:
   receiving, from a user, pre-registration information for use in authorizing a plurality of computing devices to obtain access, for a limited time, to a fiber-fed, star-topology network covering a limited geographic area,
      wherein at least one of the plurality of computing devices is not a cellular telephone,
      wherein the plurality of computing devices comprise computing devices currently available to the user and computing devices to be made available to the user within the limited geographic area, and
      wherein the limited geographic area comprises a private resort;
   presenting the user an interface for selecting and configuring a plurality of customizable services each associated with capabilities of a respective one of the plurality of computing devices to yield requested customized services for each of the plurality of computing devices; and
   upon authorization, providing non-subscription-based and non-recurring access to the requested customized services for each of the plurality of computing devices located within the limited geographic area.

14. The non-transitory computer readable medium of claim 13, wherein the plurality of computing devices comprise a laptop, a cell phone, a personal digital assistant, a portable gaming device, and a portable music device.

15. The non-transitory computer readable medium of claim 13, wherein at least one of the plurality of computing devices is leased for the duration of the access.

16. The non-transitory computer readable medium of claim 13, wherein the plurality of customizable services comprises: call forwarding to one of the plurality of computing devices to be authorized on the fiber-fed star-topology network, control of available movies, video, music, control of available games, access to the Internet, and access to means for personal communicating.

17. The non-transitory computer readable medium of claim 13, wherein the plurality of customizable services comprises control of purchasing power based on each computing device authorized on the fiber-fed star-topology network for the duration of the access.

18. The non-transitory computer readable medium of claim 13, storing additional instructions which, when executed by the processor, cause the processor to perform a method comprising:
   handing off at least one devices from pre-registry in the first fiber-fed star-topology network to a second fiber-fed star-topology network by passing the pre-registration information from a session coordinator in the first fiber-fed star-topology network to a session coordinator in the second fiber-fed star-topology network.

* * * * *